July 18, 1944.    A. E. BRICKMAN    2,353,872
SHOCK ABSORBER
Filed Nov. 30, 1942    2 Sheets-Sheet 1
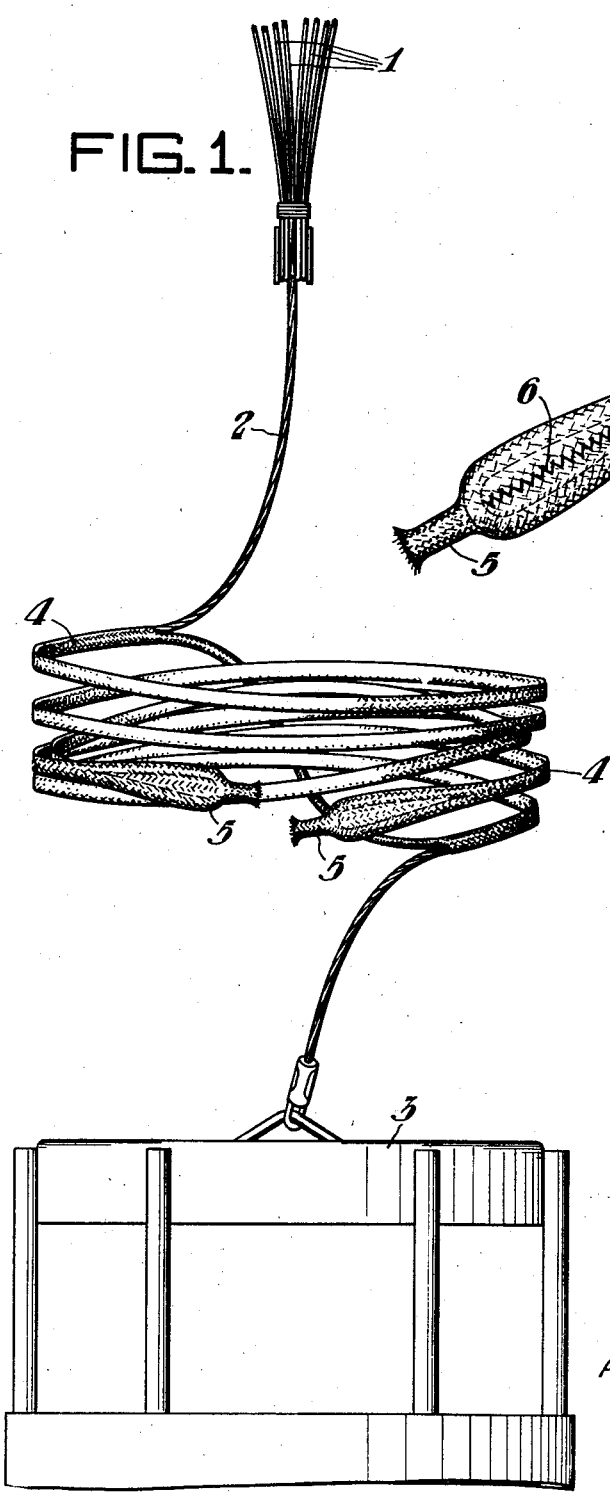
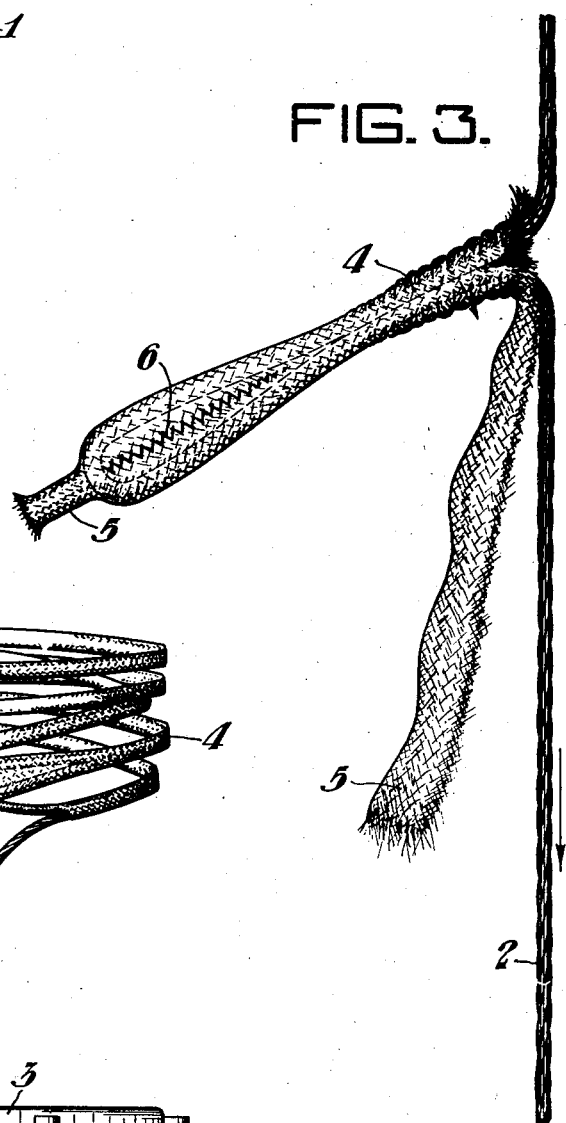
INVENTOR:
ALAN E. BRICKMAN,
BY:
John E. Jackson
HIS ATTORNEY.

July 18, 1944.  A. E. BRICKMAN  2,353,872
SHOCK ABSORBER
Filed Nov. 30, 1942  2 Sheets-Sheet 2

INVENTOR:
ALAN E. BRICKMAN,
BY:
John E. Jackson
HIS ATTORNEY.

Patented July 18, 1944

2,353,872

UNITED STATES PATENT OFFICE 2,353,872

SHOCK ABSORBER

Alan E. Brickman, New Haven, Conn., assignor to The American Steel and Wire Company of New Jersey, a corporation of New Jersey Application November 30, 1942, Serial No. 467,369

8 Claims. (Cl. 244—151)

This invention relates to shock absorbers and more particularly to such shock absorbers that are used between parachute shrouds and the prime object in descent.

With the opening of a descending parachute, a sudden deceleration is produced which causes terrific strain on the parachute, its shrouds, fittings, harness or connecting element, as well as injurious shock to the person, instrument or material attached thereto. Shock absorbers as a component between the parachute shrouds and the prime object in descent have been previously used to materially reduce terrific strain. The most common type of such shock absorbers involves the resistance to tensile forces necessary to the straightening of ductile copper tubing which has been formed into inert helical convolutions and surrounds a wire element between the parachute shrouds and the prime object in descent. The resistance to straightening is accumulative and the recoil for ductile copper thus formed is desirably low. The wire must be extra flexible to permit the small diameter coiling necessary and it becomes stressed in a peculiar kink torsion manner when functioning as a shock absorber, thus requiring a stronger wire than would otherwise be necessary.

It is an object of this invention to use a wire connector of standard flexibility and strength.

Another object is to overcome the terrific strain caused by sudden deceleration between two or more parts and thereby permit the lowering of the strength requirements of the stressed elements.

These and other objects will be more apparent after referring to the following specification and attached drawings, in which:

Figure 1 is a view of the invention showing the parachute in the early stages of opening;

Figure 2:
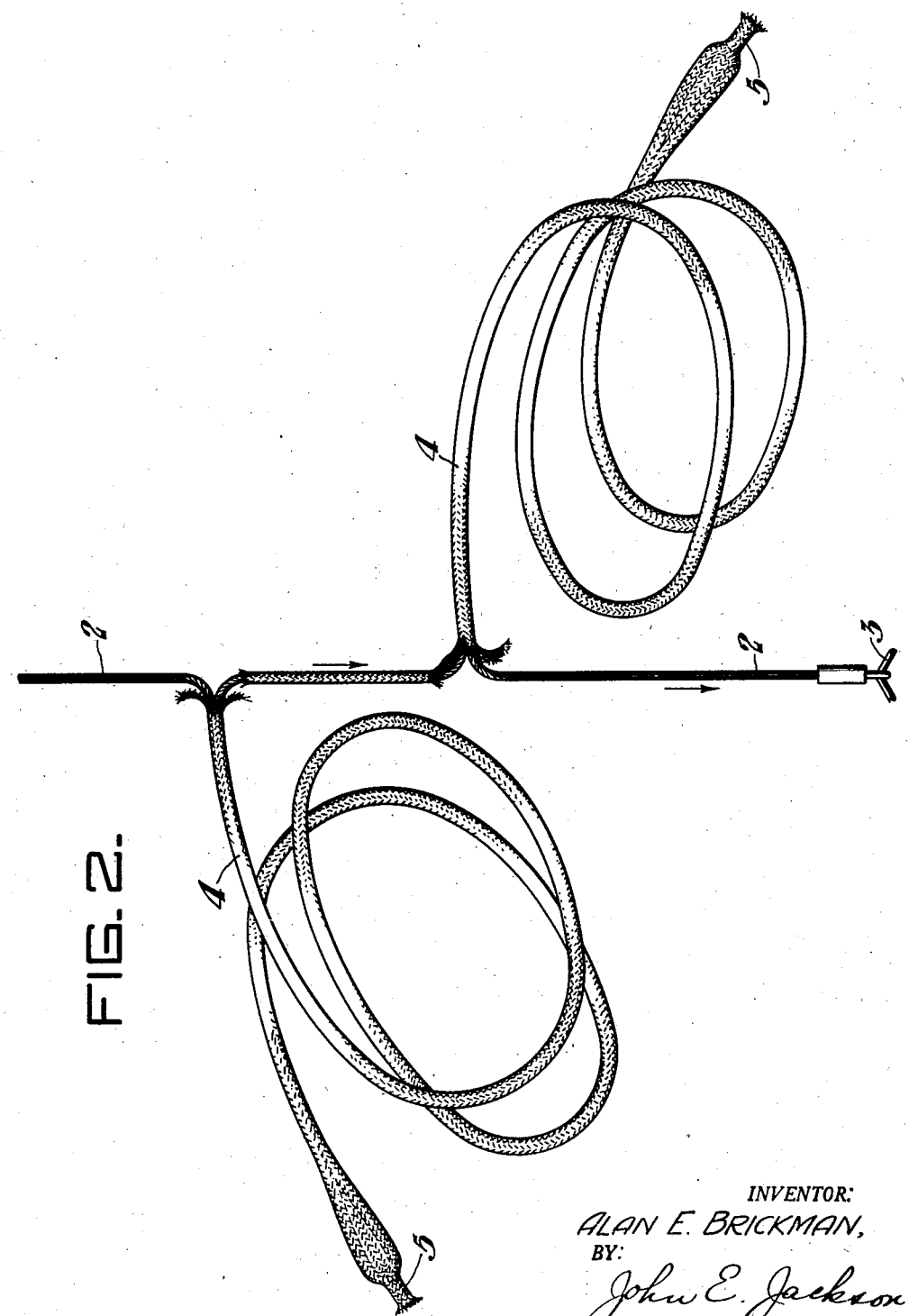
Figure 2 is a similar view showing the connector at a point where the braided sheathing is starting to offer resistance to tension forces; and, Figure 3 is a view showing the connector approaching the final functioning of the shock absorption.

Referring more particularly to the drawings, reference numeral 1 indicates parachute shrouds. Attached to the shrouds in any well-known manner is a wire connector 2. The other end of the connector 2 is fastened to a carrier or harness 3 in any well-known manner. As best shown in Figure 2, there are two return bends 4 formed in the connector. The two legs of the return bends are held in parallel relationship and sheathed by tubular braiding 5 which may be made of cotton, silk, wire, linen, etc. Stitching 6 through the eye loop at the return bends, prevents the braid from worming off like a sleeve when it approaches the condition shown in Figure 3.

The operation of the device is as follows. As the parachute starts to open, the coiled connector is drawn from the container as shown in Figure 1. As the parachute continues opening, its velocity decreases, while the velocity of the carrier 3 increases or remains approximately constant. When the relative position of the parachute and carrier has reached the point shown in Figure 2, the connector has just reached the point where the braided sheathing 4 starts to offer resistance to the tension forces caused by the great differences in the rate of descent of the open parachute and the falling container. This shock absorbing resistance is accumulative due to the characteristics of braided sheathing to work back in a bundled cuff fashion under opposite direction pull parting. This shock absorbing resistance continues until the return bends have straightened and torn the braided sheathing apart. The last stages of this step are shown in Figure 3.

To adapt the shock absorber for various uses, it is necessary that the resistance values be changed. This may be done in several ways. The braiding material may be varied or the pitch lead of the braiding changed. The braiding material may be coated either before or after braiding. There may be any number of return bends sheathed with any combination of materials. Shorter pitch in the braiding reduces slippage on the wire cord so as to produce a smoother resistance curve. Double braiding approximately doubles the resistance values of single braiding. Adhesive tape may be used in place of braiding or in addition thereto. The adhesive tape is spirally wound over the return bends and the resistance values may be varied by using a progressive change in pitch.

While the invention has been described with reference to parachutes, it may be used advantageously in mail pickup by planes and glider pickup by planes. It will be apparent to one skilled in the art that these and other modifications may be made without departing from the scope of the following claims.

I claim:

1. A shock absorber of the class described comprising a wire member having a return bend therein and a braiding for sheathing the parallel lengths of the return bend.

2. A shock absorber for a parachute having parachute shrouds and a carrier cage comprising a wire member between the shrouds and the carrier cage, a return bend formed in the wire member and a braiding for sheathing the parallel lengths of the return bend.

3. A shock absorber of the class described comprising a wire member having a return bend therein and braiding for holding the legs of the return bend in parallel relationship and for sheathing the said legs.

4. A shock absorber of the class described comprising a wire member having a plurality of return bends therein and braiding for holding the legs of each of the return bends in parallel relationship and for sheathing the legs.

5. A shock absorber for a parachute having parachute shrouds and a carrier cage comprising a wire member between the shrouds and the carrier cage, a return bend formed in the wire member and a braiding for sheathing the parallel lengths of the return bend, the braided sheathing offering resistance to tension forces between the shrouds and carrier cage to thereby absorb shock.

6. A shock absorber for a parachute having parachute shrouds and a carrier cage comprising a flexible member between the shrouds and the carrier cage, a return bend formed in the flexible member, fracturable means for sheathing said first named means, the fracturable means offering resistance to tension forces between the parachute and carrier cage to thereby absorb shock.

7. A shock absorber of the class described comprising a flexible member having a return bend therein and fracturable means for sheathing the parallel lengths of the return bend.

8. A shock absorber for a parachute having parachute shrouds and a carrier cage comprising a flexible member between the shrouds and the carrier cage, a return bend formed in the flexible member and a fracturable member for sheathing the parallel lengths of the return bend.

ALAN E. BRICKMAN.